Jan. 5, 1954 P. G. MARIÉ 2,665,383
MICROWAVE DISPERSIVE MIRROR
Filed Jan. 28, 1953 9 Sheets-Sheet 1

Fig.1

PIERRE G. MARIÉ

Jan. 5, 1954

P. G. MARIÉ

2,665,383

MICROWAVE DISPERSIVE MIRROR

Filed Jan. 28, 1953

PIERRE G. MARIÉ

PIERRE G. MARIÉ

Jan. 5, 1954

P. G. MARIÉ

2,665,383

MICROWAVE DISPERSIVE MIRROR

Filed Jan. 28, 1953

PIERRE G. MARIÉ

Fig.12

Jan. 5, 1954 P. G. MARIÉ 2,665,383
MICROWAVE DISPERSIVE MIRROR
Filed Jan. 28, 1953 9 Sheets-Sheet 8

Fig.13

PIERRE G. MARIÉ

Fig. 14

Patented Jan. 5, 1954

2,665,383

UNITED STATES PATENT OFFICE 2,665,383

MICROWAVE DISPERSIVE MIRROR

Pierre G. Marié, Paris, France

Application January 28, 1953, Serial No. 333,643

Claims priority, application France
January 31, 1952

5 Claims. (Cl. 250—33.65)

The present invention relates to a dispersive alveoled mirror for micro-waves and precisely to a mirror designed for reflecting an electromagnetic energy occupying a large bandwidth and having a given incidence direction into a plurality of electromagnetic waves, each of them occupying a partial bandwidth called "channel" and having a peculiar emergence direction dependent on the average frequency of the channel.

The surface of the mirror looks like cells of bee-hives with the difference that those alveoles are very deep and end in a point. Their transversal dimensions at the opening are included between the half wavelength and the wavelength of the wave having the greatest wavelength included in the energy to be reflected. The waves penetrate into the alveoles and are reflected when the bringing of sides together does not allow any longer the propagation. The depth in which the waves penetrate before being reflected depends on the wavelength and consequently each wave corresponding to a different channel is reflected at a different depth.

From the point of view of the reflected waves, the alveoled mirror is equivalent to a mirror formed with a metallic and continuous surface which will pass through the points in which the waves are no longer propagated into the alveoles. This regular metallic surface will be named in the present specification "equivalent mirror."

Should the depth of the alveoles change regularly at least along a line of curvilineal coordinate drawn on the surface of the mirror, the orientation of the equivalent mirror changes with the wavelength when one moves from one side to the other of the alveoled mirror and a dispersion effect is obtained.

In the case when the incident and reflected waves are no longer free or unguided waves but waves guided between two parallel metallic planes separated with a distance comprised between the wavelength and the half wavelength of the wave having the greatest wavelength included in the energy to be reflected, the mirror can include only one line of alveoles put in a straight line parallel to the said metallic planes and one can do away with the partitions of the alveoles which are perpendicular to the electric field. Then waves the electric field of which is parallel to the metallic planes limiting the propagation are used. The walls of the alveoles which are parallel to the electric field are kept alone and they form a dihedral of variable depth the sides of which join with the planes limiting the propagation. The walls of the dihedral are no more planes but ruled surfaces the shape of which will be determinated hereinafter.

The mirrors according to the present invention will be termed "alveoled mirrors" in the case when they reflect free waves and "dihedral mirrors" in the case when they reflect guided waves.

The invention will be more fully understood from a perusal of the following specification taken in conjunction with the drawing on which

Figure 1:
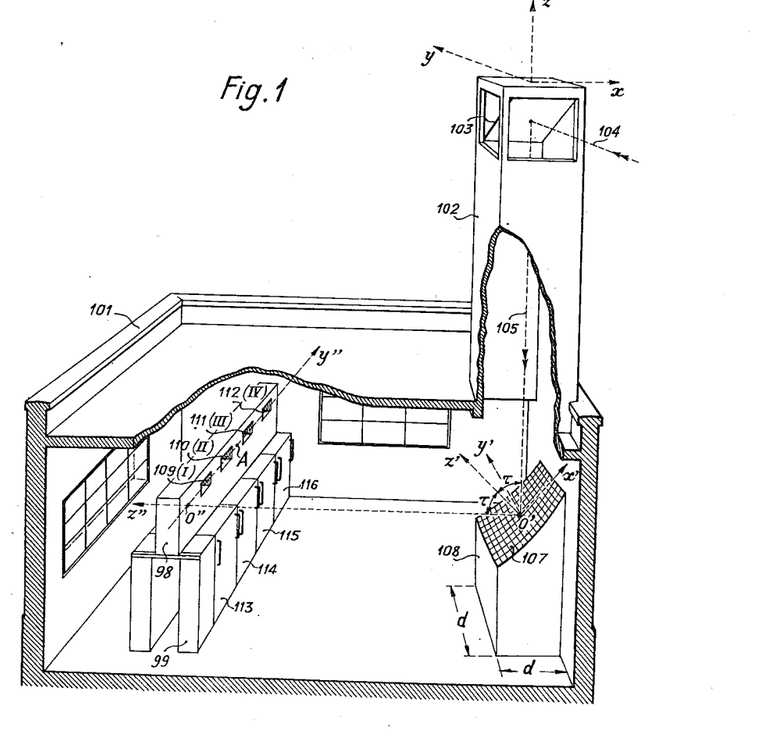
Fig. 1 shows the whole alveoled mirror arranged with transmitting and receiving antennae corresponding to the different channels.

It will be assumed in the following specification that the electromagnetic energy to be reflected includes four partial bands or channels namely I, II, III and IV, the central wavelengths of which are respectively $\lambda_1$, $\lambda_2$, $\lambda_3$, $\lambda_4$. These channels have for instance the following limits:

| | | |
|---|---|---|
| I | 9,000 to 9,100 mc./s. | $\lambda_1 = 9,050$ mc./s. |
| II | 9,800 to 9,900 mc./s. | $\lambda_2 = 9,850$ mc./s. |
| III | 10,600 to 10,700 mc./s. | $\lambda_3 = 10,650$ mc./s. |
| IV | 11,400 to 11,500 mc./s. | $\lambda_4 = 11,450$ mc./s. | will designate hereinafter any wavelength
prised between 9,000 and 11,500 mc./s. How-
in some cases λ will be taken as the median
elength of the bandwidth occupied by all the
nnels, i. e. 10,250 mc./s.
ferring to Fig. 1, 101 is a building topped by
wer 102. At the top of this tower is located
ne mirror 103 which sends back in the verti-
downright direction 105 coincident with the
of the tower, a plane wave coming from the
ction 104. The tower referred to is a trihedral
z the axis Oz of which is vertical and the axes
and Oy of which are horizontal and, for ex-
le, parallel to the vertical walls of the tower.
he alveoled mirror 107 is placed below the
er 102 on a square supporting member having
le d. The mirror is referred to axes O'x'y'z'.
plane O'x' y' is tangent to the surface of the
ror in its centre O' and the axis O'x' is situ-
l in the plane Oxz. O'z', normal to the centre
he mirror, makes an angle τ with Oz.
he front face 92 of the mirror 107 (Figs. 4
5) is an element of a paraboloid of revolution
ing its axis parallel to Oz and its focus in
Should the mirror 107 be not dispersive, the
ne wave of large bandwidth coming from 104,
ected by the mirror 103 along the direction
and by the mirror 107 along the direction 106,
ld converge in O''.
he mirror 107 comprises alveoles 93 the basis
vhich is a square having a side b, of depth R
having the shape of pyramidal horns. The
b is comprised between the wavelength and
half wavelength of the wave of largest wave-
gth included in the energy to be reflected.
he depth R of each alveole is linearly variable
ng a line of curvilineal coordinate drawn on
surface 92 of the mirror and is constant along
ne of curvilineal coordinate perpendicular to
former one. For instance, R is a linear func-
n of $y'$, and is independent of $x'$. It will be
ed:

$$R = R_0 + vy'$$

Figure 2:
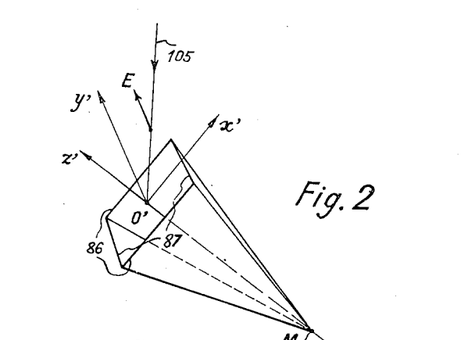
Fig. 2 represents the disposition of the electric vector of the incident wave with respect to an alveole.
Figure 3:
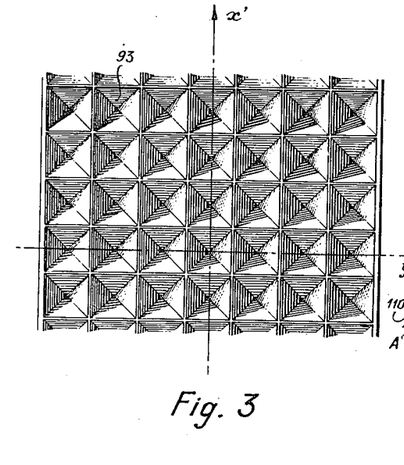
Fig. 3 is a front view of an element of the reflecting surface of the mirror in which the alveoles can be seen.
Figure 7:
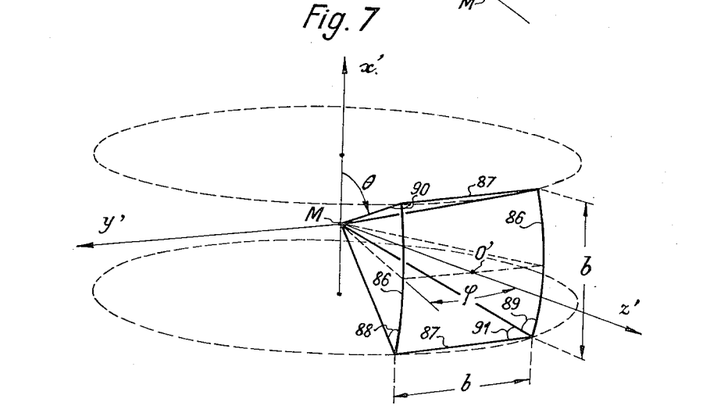
Fig. 7 represents the surfaces of coordinates used for the calculation of the propagation function of the waves in the alveoles.

The operation of the alveoled mirror deduces it-
from the study of the reflection of the waves
slim horns and is analysed as following:
The general method called the Borgnis method
study the propagation of the waves inside a
de, a horn or any metallic surface consists in
ploying curvilineal rectangular coordinates
h that the metallic surfaces which constitute
walls of the propagation medium be surfaces
coordinates. In this way, the conditions to
limits are pretty easy to express.
n the case when the metallic surfaces form a
ramidal horn with square basis this method is
ictly inapplicable because the sides of the horn
ng not orthogonal, cannot be surfaces of co-
linates in a system of orthogonal coordinates.
the case when the pyramid is very slender, it
y however be obtained an approximate solu-
n by using spheric coordinates (Fig. 7). The
o sides 88 and 89 of the pyramid are thus planes
$=Cte$ ($\phi$=azimuth) and the two sides 90 and 91
replaced by portions of conical surfaces $\theta=Cte$
=colatitude).
Numerous treatises give the solution of the
xwell's equations in this system of coordinates
rticularly Louis de Broglie—Problems of
ided propagation—Gauthiers-Villars 1941, page
).
Incident and reflected waves have an electric
tor E which is perpendicular to the axis Mz'
a pyramidal horn (M is the summit of the pyr-
id) and for instance parallel to O'y' (Fig. 2).

The axis Mz' has for equation: $\phi=0$ (Fig. 7)

$$\theta = \frac{\pi}{2}$$

The radial component of the field in the horn
must be zero and consequently, the solutions of
interest for the considered problem are those of
the magnetic type, the general form of which is
for the electric field:

(2)
$$\begin{cases} E_r = 0 \\ E_\theta = \frac{jk^2 m}{kr \sin\theta} J_{n+\frac{1}{2}}(kr) \frac{\cos}{-\sin} m\varphi P_n^m(\cos\theta) e^{jkct} \\ E_\varphi = \frac{-jk^2}{kr} J_{n+\frac{1}{2}}(kr) \frac{\sin}{\cos} m\varphi \frac{\partial}{\partial\theta} P_n^m(\cos\theta) e^{jkct} \\ \text{with } k = \frac{2\pi}{\lambda} \end{cases}$$

wherein c is the velocity of the light
r the distance from a point of the pyramidal horn
to the summit M
J Bessel function
$P_n^m (\cos\theta)$ associated Legendre polynoms which de-
duce themselves from ordinary Legendre polynoms
$P_n (\cos\theta)$ by the formula:

(3) $$P_n^m(\cos\theta) = \sin^m\theta \frac{d^m P_n(\cos\theta)}{(d\cos\theta)^m}$$

Legendre polynoms of order $n, P_n(\cos\theta)$, possess
n real and distinct roots corresponding to $\cos\theta$
comprised between +1 and −1. It may be de-
duced that associated polynoms $$P_n^m(\cos\theta)$$

possess $(n-m)$ real and distinct roots. When $\theta$
varies the field $E_\theta$ is annulled and changes its
sign when one passes on a zero of $$P_n^m(\cos\theta)$$

If it is desired to join the wave propagating in
the horn to a plane wave polarized along Mx'
(Fig. 7) or O'x' (Fig. 2), it is necessary that $E_\theta$
be a value as constant as possible in function of
$\theta$, that is to say m must be equal to n in order
that $$P_n^m(\cos\theta)$$

has no more roots comprised between −1 and +1.
The associated polynoms are then reduced to:

(4) $$P_n^m(\cos\theta) = \sin^n\theta \frac{(2n)!}{2^n n!}$$

and in the vicinity of the equatorial plane, $\theta$ being
very close to $\pi/2$, the Equations 2 are reduced to:

(5) $$\begin{cases} E_r = 0 \\ E_\varphi = 0 \\ E_\theta = E \frac{J_{m+\frac{1}{2}}(kr)}{kr} \cos m\varphi \end{cases}$$

E being an arbitrary field unit.
$E_\theta$ must be annulled along the metallic walls
corresponding to angles $$\varphi = \pm \frac{b}{2R}$$

At last we have:

$$\frac{b}{2R} = \frac{\frac{\pi}{2} + K\pi}{m}$$

wherein K is an integer, so we have:

(6) $$m = \left(K + \frac{1}{2}\right)\frac{2\pi R}{b}$$

As b is comprised between λ/2 and λ, the modes corresponding to $K \neq 0$ are practically evanescent (the function $$J_{m+\frac{1}{2}}(kr)$$

does not reach a first maximum). We only consider the solution corresponding to $K=0$. For this solution we can replace the Bessel function by an asymptotic value:

(7) $\quad J_{m+\frac{1}{2}}(kr) \approx \sqrt{\frac{2}{\pi kr}} \cos\left[kr - (m+1)\frac{\pi}{2}\right]$ If instead of being reflected in a horn, the wave has been reflected on a plane located at a distance $s$ behind the entrance of the horn, after having propagated freely, the intensity in the plane of the horn will vary like $\cos 2\pi s/\lambda$. By identifying $2\pi s/\lambda$ with the expression the cosine of which is taken in (7) and by replacing $k$ by its value (2), $m$ by its value (6) wherein $K=0$, and $r$ by $R$, we obtain a value of $s$ which, by definition, will be called the penetration of the wave into the horn:

(8) $\quad s = R\left(1 - \frac{\pi \lambda}{4b}\right) - \frac{\lambda}{4}$

The pyramidal horn is equivalent from the point of view of the reflection to an element of mirror which would be situated at a depth $s$ behind its opening side. This result is not peculiar to pyramidal horns with square bases but is extensible to conical horns, their bases being either circular or polygonal.

Beyond the depth $s$, the behaviour of the Bessel function looks like the exponential decrease of the evanescent waves.

Figure 4:
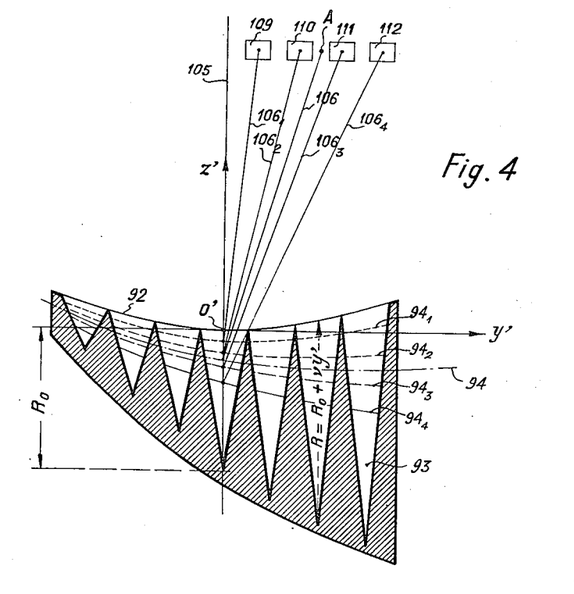
Fig. 4 is a section by the plane $O'y'z'$ of Fig. 1 of the element of the surface of the alveoled mirror shown in Fig. 3.
Figure 5:
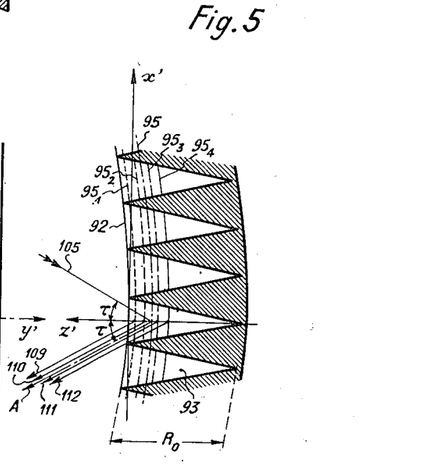
Fig. 5 is a section by the plane $O'x'z'$ of Fig. 1 of the element of the surface of the alveoled mirror shown in Fig. 3.

When a great number of alveoles such as 93 the depth of which is given by Equation 1 are placed side by side in order to form an alveoled mirror, the $z'$-coordinate of the equivalent mirror with reference to the plane $O'x'y'$ is for the wavelength $\lambda$:

(9) $\quad z' = \varphi(x', y') - (R_0 + \nu y')\left(1 - \frac{\pi \lambda}{4b}\right) + \frac{\lambda}{4}$ The sections of the equivalent mirror for the wavelength $\lambda$ by the planes $y'O'z'$ and $x'O'z'$ are respectively represented at 94 and 95 in Figs. 4 and 5 and the sections of the equivalent mirrors for the wavelengths $\lambda_1, \lambda_2, \lambda_3, \lambda_4$, by these same planes are represented at $94_1, 94_2, 94_3, 94_4$ in Fig. 4 and $95_1, 95_2, 95_3, 95_4$ in Fig. 5.

The function $\varphi(x', y')$ is the $z'$-coordinate of the front face 92 of the mirror above $O'x'y'$. It is a homogeneous function of the second degree since it represents the $z'$-coordinate of a portion of paraboloid with reference to its tangent plane. The orientation of the tangent plane to the equivalent mirror for the wavelength $\lambda$, which is also a paraboloid of revolution, depends on the coefficient of $y'$ which is expressed in Equation 9; this coefficient is small because $b$ is near and slightly superior to $\lambda/2$. When $\lambda$ changes of $\delta\lambda$, the tangent plane rotates about an angle $$\delta\beta = \frac{\pi \nu \delta \lambda}{4b}$$

around $O'x'$ and should $O'A$ (Fig. 1) indicate the direction of the reflected ray for the wavelength $\lambda$, the displacement of the spot forming at A is:

(10) $\quad \delta y'' = \frac{\pi \nu \delta \lambda}{4b} F \cos \tau$ along a line $O''y''$ parallel to $O'y'$, $\tau$ being the angle of incidence of the ray directed along $Oz$ with the plane tangent to the centre of the mirror and F the focal distance of the latter.

The dimensions of the mirror are: $d$ in the direction $O'y'$ and $d/\cos \tau$ in the direction $O'x'$. The section of the wave-beam in the neighbourhood of the mirror is $a \times a$. In these conditions, in order that two focal spots may be separable, it is necessary that their centres be separate by $2F\lambda/a$. In order that the mirror might separate two channels, it is necessary that:

(11) $\quad \delta y'' \geqslant 2F\lambda/a$ that is to say, referring to Equation 10:

(12) $\quad \nu \geqslant \frac{4}{\pi \cos \tau} \frac{b}{d} \frac{\lambda}{\delta\lambda}$ The difference of frequency between the channels to be separated by the dispersion of the mirror (channels I and II for example) is 800 mc./s. The average frequency is 10,250 mc./s. So we have thereabouts $\lambda/\delta\lambda = 13$. If $\tau = \pi/4$, $d = 70$ cm., $b = 2$ we have: $\nu \geqslant 0.32$.

It is better to adopt $\nu = 0.32$. If it is so, the depth of the alveoles is 12 cm. for instance on the side of negative $y''$ and increases regularly up to 34.4 cm., depth reached on the other side.

It should be noticed that the difference of depth between the horns situated on opposite sides, equal to $\nu d$, is consequently of the form of $\nu$ given by Equation 12 independent of $d$.

Figure 6:
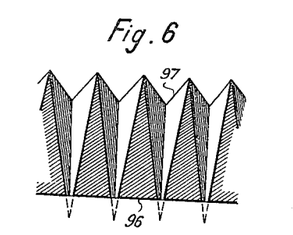
Fig. 6 is a variant of the shape of the alveoles.

Seeing that the waves are not propagated up to the end of the pyramids 93, we can limit the alveoled mirror backwards by a surface 96 passing through the sections of the different pyramids having dimensions such that the propagation cannot take place underneath, for instance having dimensions equal to the fourth of the wavelength which is the shortest (Fig. 6).

To reduce as much as possible the reflection on the input surface of the alveoles, square indentations or saw-tooth shaped indentations, $\lambda/4$ deep, are cut out on their edges as illustrated in Fig. 6.

In the vertical plane passing by $O''y''$ is located a panel of exploitation 98 in the front face of which issue four horns 109 to 112, each of them connected to one of the communication channels. The reference numeral of the channel the horn of which is designed for picking-up its energy, is written beside this horn. The horns are situated on a row parallel to $O''Ay''$ where $O''$ will be the point of focalisation of the wave 104 should the mirror be not dispersive and A the point of focalisation of the wave of average wavelength.

Each horn is connected, through not represented guides, to circuits of radio-frequency, intermediate frequency and demodulation appropriate to the different channels and which are shown by the racks 113 to 116 of the furniture 99.

On Figs. 4 and 5 is represented an incident ray 105 and also the rays $106_1$ reflected by the equivalent mirror $94_1$—$95_1$ for the wavelength $\lambda_1$, $106_2$ reflected by the equivalent mirror $94_2$—$95_2$ for the wavelength $\lambda_2$, $106_3$ reflected by the equivalent mirror $94_3$—$95_3$ for the wavelength $\lambda_3$, $106_4$ reflected by the equivalent mirror $94_4$—$95_4$ for the wavelength $\lambda_4$, and at least 106 reflected by the equivalent mirror 94—95 for the average wavelength $\lambda$. The rays $106_1$ to $106_4$ lead respectively to the horns 109 to 112 and the ray 106 leads to point A.

Figure 8:
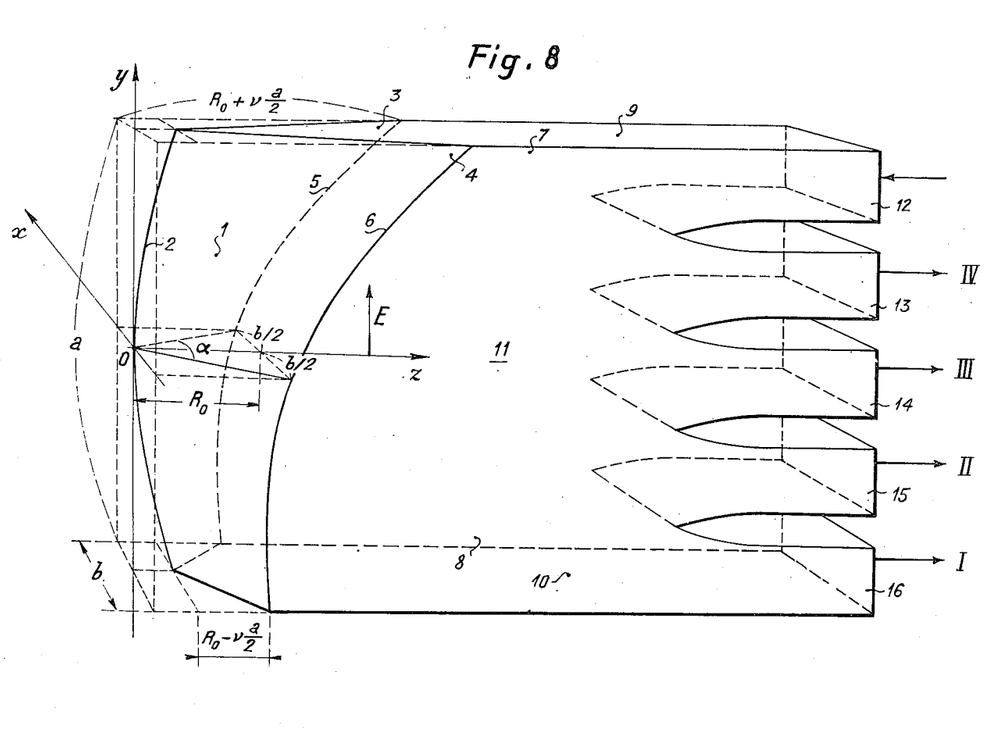
Fig. 8 is a perspective view of a dihedral dispersive mirror giving an effect of focalisation.

Referring to Fig. 8, the dihedral mirror is formed with a metallic sheet 1 folded up and having an edge 2, two lateral faces 3 and 4, and two eral sides 5 and 6. The shape of the edge 2 determined in function of the required focalisation. The curve formed with this edge, referred to the axes $Oy$ and $Oz$, has for equation:

$$z = F(y) \tag{13}$$

wherein F is a polynom of the second degree of the variable $y$ which, as will be seen hereinafter, can get down to the first degree when no focalisation is needed.

The entrance-surface of the dihedral is a cylinder with generatrices parallel to $Ox$ and leaning against the lateral sides 5 and 6. The width of this surface is comprised between the wavelength and the half wavelength of the wave having the longest wavelength comprised in the power to be reflected. The height in a direction parallel to the axis $Oy$ is equal to $a$. The depth counted in the plane $yOz$ between the entrance-surface and the edge 2 varies linearly with $y$ and its depth is expressed by the equation:

$$R = R_0 + \nu y \tag{14}$$

$R_0$ being the depth in the plane $xOz$ and $\nu$ a coefficient of proportionality. The depth is but the distance between the edge 2 and the common projection curve on the plane $yOz$ of the lateral sides 5 and 6. The equation of this latter curve is thus:

$$z = F(y) + R_0 + \nu y \tag{15}$$

The sides 5 and 6 are respectively located in the planes $$x = \frac{b}{2}$$

and $$x = -\frac{b}{2}$$

and the walls 3 and 4 of the mirror are ruled surfaces. Therefrom the equations of the said surfaces are:

(16) $\quad z = F(y) + (R_0 + \nu y)\frac{2x}{b}$ for the wall 3

(17) $\quad z = F(y) - (R_0 + \nu y)\frac{2x}{b}$ for the wall 4

The aperture angle of the dihedral varies with the ordinate $y$, and assuming it still small, it gets the approximate value:

$$(18) \quad \alpha = \frac{b}{R_0 + \nu y}$$

In such a dihedral the electromagnetic waves propagate in such a way that the electric field E parallel to the edge is proportional to:

$$J_q\left(\frac{2\pi r}{\lambda}\right) \cos \frac{qx}{r}$$

wherein $J_q$ is the Bessel function of first kind and order $q$, $r$ is the distance between a given point and the edge; $\lambda$ is the wavelength of a monochromatic wave comprised in the electromagnetic energy to be reflected.

The order $q$ of the function is taken such that the electric field is zero along the walls of the dihedral, so we have:

$$(19) \quad q = \frac{\pi}{\alpha} = \pi \frac{R_0 + \nu y}{b}$$

At the entrance of the dihedral, $r$ is always greater than a certain number of wavelengths and in these conditions the Bessel function can be expressed as follows:

$$(20) \quad J_q\left(\frac{2\pi r}{\lambda}\right) = \frac{1}{\pi}\sqrt{\frac{\lambda}{r}} \cos\left[\frac{2\pi r}{\lambda} - \left(q + \frac{1}{2}\right)\frac{\pi}{2}\right]$$

If, instead of being reflected in the dihedral, the wave was reflected back against a cylindrical mirror situated at a distance $s$ behind the entrance-surface of the dihedral after having propagated unguidedly, the intensity in the plane of entrance of the dihedral would have been proportional to $$\cos \frac{2\pi s}{\lambda}$$

Identifying $$\frac{2\pi s}{\lambda}$$

with the term of which the cosine is taken in Equation 20, there is obtained a value of $s$ which, by definition, will be called penetration of the wave into the dihedral. In this identification, it is right to give its value (19) to $q$ and to consider that $r$ which designates the distance between the entrance-surface of the dihedral and its edge has the value R given by Equation 14.

So we have:

$$(21) \quad s = (R_0 + \nu y)\left(1 - \frac{\pi\lambda}{4b}\right) - \frac{\lambda}{8}$$

This formula is very similar to the Formula 8. However the term in $$\frac{\lambda}{4}$$

of this latter is here replaced by a term in $$\frac{\lambda}{8}$$

The cylindrical mirror equivalent to the dihedral mirror has for equation: $Z = z - s$ wherein $z$ is the coordinate of the entrance-surface of the dihedral given in function of $y$ by Equation 15.

Giving to $z$ and $s$ their values in function of $y$ given by Equations 15 and 21 there is obtained:

$$(22) \quad Z = F(y) + (R_0 + \nu y)\frac{\pi\lambda}{4b} + \frac{\lambda}{8}$$

It should be noticed that in this formula the term of the second degree $F(y)$ on which depends the nature of the focalisation is independent of $\lambda$ but that the term of the first degree on which depends the angle $\beta$ (see Fig. 9) made by the tangent plane to the equivalent cylindrical mirror along the generatrix of this mirror situated in the plane $xOz$ with this latter plane is a function of $\lambda$. This orientation $\beta$ is given by the equation:

$$(23) \quad \cotg \beta = \frac{\pi\nu\lambda}{4b}$$

Figure 9:
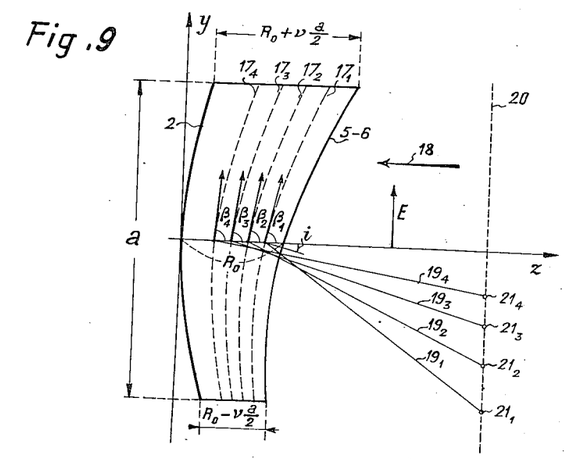
Fig. 9 represents the same mirror in projection on its plane of symmetry.

It follows from Equations 21, 22, 23 that, when the wavelength $\lambda$ varies and for instance decreases, on one hand the penetration $s$ increases and on the other hand the angle $\beta$ increases. On the Fig. 9 are represented four positions $17_1$, $17_2$, $17_3$, $17_4$ of the equivalent mirror corresponding to the four wavelengths $\lambda_1$, $\lambda_2$, $\lambda_3$, $\lambda_4$, comprised in the energy to be reflected as well as the corresponding angles $\beta_1$, $\beta_2$, $\beta_3$, $\beta_4$. A plane wave propagating along the direction 18 parallel to $Oz$ and comprising four monochromatic waves of wavelengths $\lambda_1$, $\lambda_2$, $\lambda_3$, $\lambda_4$, is reflected, dispersively according to the wavelength, in the directions $19_1$, $19_2$, $19_3$, $19_4$ and forms, in the focal plane 20, four spots $21_1$, $21_2$, $21_3$, $21_4$.

If F is the focal distance of the mirror (focal distance of the curve 2), at a variation $d\lambda$ of the wavelength will correspond a displacement $2Fd\beta$ of the spot, $d\beta$ being given by the equation:

$$(24) \quad d\beta = \frac{1}{\lambda\left[\frac{\pi\nu\lambda}{4b} + \frac{4b}{\pi\nu\lambda}\right]} d\lambda$$

For an angle of incidence $i$, the width of the focal spot relative to a monochromatic wave of wavelength $\lambda$ is equal to $$\frac{2F\lambda}{a \cos i}$$

In order that two focal spots corresponding to two different wavelengths be distinct, it is necessary that:

$$2Fd\beta \geq \frac{2F\lambda}{a \cos i}$$

which gives, replacing $d\beta$ by its value from Equation 24, the minimum wavelength difference between two separable waves:

$$(25) \quad d\lambda \geq \frac{\lambda^2}{a \cos i}\left[\frac{\pi\nu\lambda}{4b} + \frac{4b}{\pi\nu\lambda}\right]$$

The mirror is preceded by two metallic lateral walls 7 and 8 joined to the sides 5 and 6 and consequently separated by a distance $b$. Two other metallic walls 9 and 10 limit at the top and at the bottom the mirror and form with the walls 7 and 8 a chamber 11. In this chamber open the mouths of five guides 12, 13, 14, 15, 16, the first 12 reserved to the feed of the mirror and the four others adapted to collect the partial energies belonging to the channels I, II, III, IV.

The shape of the curve 2 depends on the focalisation to be realized. In the case of Fig. 9 it is assumed that the incident wave is plane and the reflected waves are spherical ones. In this case, the curve drawn by the edge 2 is a parabola as well as the curves drawn by the sides 5 and 6 and the entrance-surface of the mirror is a parabolic cylinder.

Figure 10:
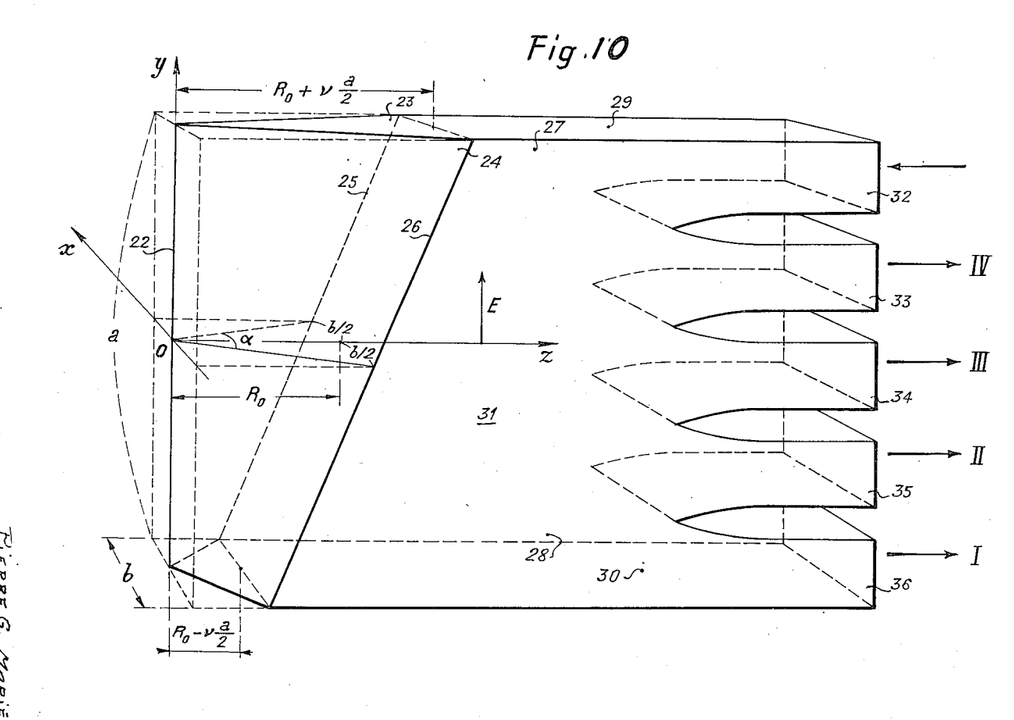
Fig. 10 is a perspective view of a dihedral dispersive mirror equivalent to a plane mirror.

Fig. 10 is relative to the case of a plane mirror for the transformation of a plane wave into several plane waves having emergence directions distinct in function of the frequency.

The edge 22 of the dihedral is a straight line, the two lateral sides 25 and 26 are straight lines too, the lateral walls 23 and 24 are portions of a hyperbolic paraboloid and the entrance-surface of the mirror is a plane. The distance in the plane $yOz$ between the edge 22 and the sides 25 and 26 varies linearly in function of the ordinate $y$. It is given, like in the case of Fig. 8, by the Formula 14. Like in the case of Fig. 8 also, the mirror is preceded by a chamber 31 formed with the plane metallic walls 27, 28, 29, 30 in which open the mouths of five guides 32, 33, 34, 35, 36, the first 32 being reserved for the illumination of the mirror and the four other ones being adapted to collect the partial energies belonging to the channels I, II III, IV.

Figure 11:
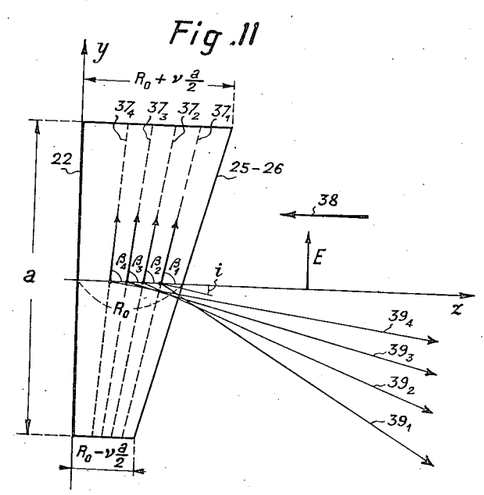
Fig. 11 represents the same mirror in projection on its plane of symmetry.

In Fig. 11, there is represented in projection on the plane $yOz$ the edge 22, the sides 25 and 26 and four positions $37_1$, $37_2$, $37_3$, $37_4$ of the equivalent plane mirror corresponding to the four wavelengths $\lambda_1$, $\lambda_2$, $\lambda_3$, $\lambda_4$. A plane wave propagating along the direction 38 parallel to $Oz$ and containing four monochromatic waves of wavelengths $\lambda_1$, $\lambda_2$, $\lambda_3$, $\lambda_4$, is reflected dispersively in function of the wavelength in the directions $39_1$, $39_2$, $39_3$, $39_4$.

Figure 12:
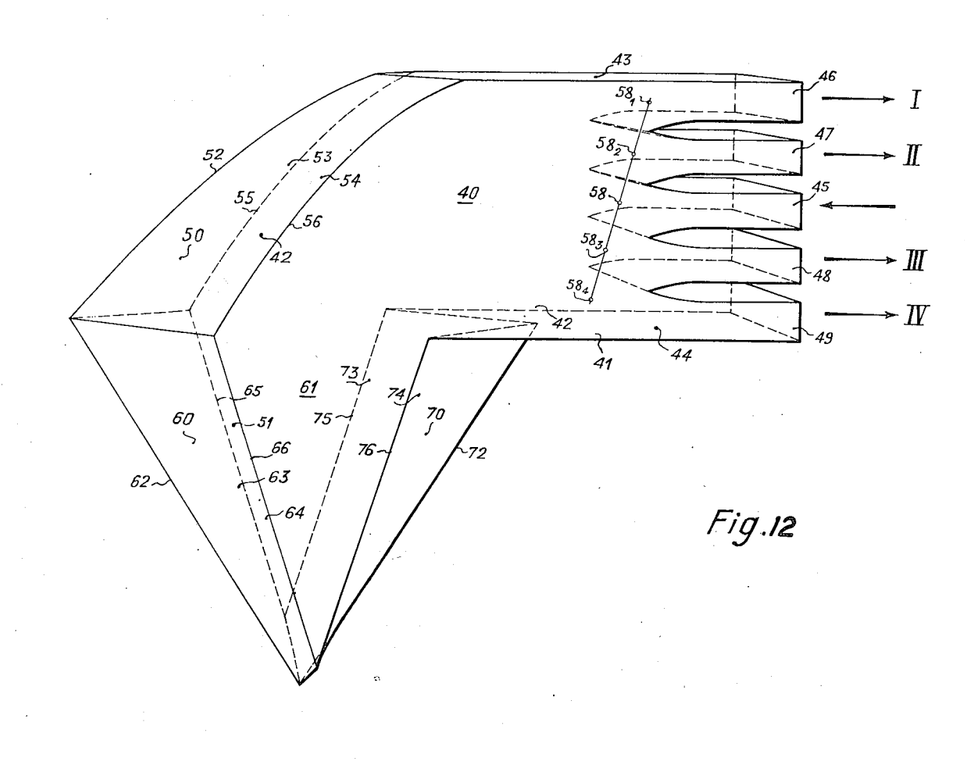
Fig. 12 is a perspective view of a composite mirror formed with a mirror according to Fig. 8 and two mirrors according to Fig. 10 for increasing the dispersive effect.

In order to amplify more fully the effect of dispersion of the dihedral mirror of the invention, it is possible to associate several mirrors as it is shown in Fig. 12.

The chamber 40 is formed with the plane metallic walls 41, 42, 43, 44, and in this chamber open the input guide 45 and the output guides 46 47, 48, 49 for picking-up the partial energies corresponding to the four channels. The dihedral mirror 50 is of the type of Fig. 8 and includes the parabolic edge 52, the walls 53 and 54, and the parabolic sides 55 and 56. The dihedral mirror 60 is of the type of Fig. 10 and includes the rectilineal edge 62, the walls 63 and 64, and the rectilineal sides 65 and 66. The dihedral mirror 70 is equally of the type of Fig. 10 and includes the rectilineal edge 72, the walls 73 and 74, and the rectilineal sides 75 and 76. The walls 41 and 42 include extension portions which are triangular shaped 51 and 61 for the closing of the chamber 40.

Figure 13:
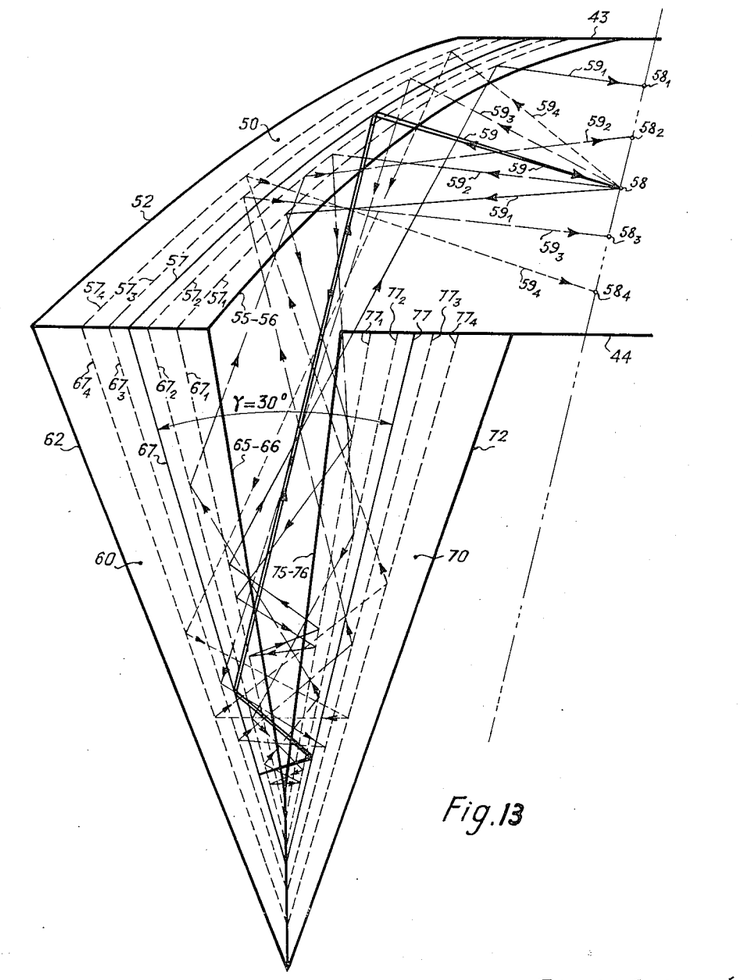
Fig. 13 represents the same composite mirror in projection on its plane of symmetry.

Fig. 13 represents the parabolic mirror 50 and the plane mirrors 60 and 70 in projection on the plane $yOz$. 57, 67 and 77 are respectively the positions of the equivalent mirrors for a monochromatic wave of wavelength $\lambda$. Let us assume $\gamma$ to be the angle between the equivalent plane mirrors 67 and 77. Should $\gamma$ have the value $$\frac{2\pi}{n}$$

an electromagnetic ray entering in a direction parallel to an equivalent plane mirror goes out in a direction parallel to the said plane mirror after $2n-1$ reflections on the whole of the two plane mirrors. If for instance $n=3$ and if it the angle $\gamma$ is equal to 30°, there are five reflections as it can be seen on Fig. 13.

Consequently if the focus 58 of the parabolic equivalent mirror 57 is located in the neighbourhood of the output of the guide 45 in the chamber 40, and if the axis of the parabola 57 is parallel to the equivalent mirror 77, a spherical wave of wavelength $\gamma$ issued from this focus and represented by the ray 59 falls upon the equivalent mirror 57; it is transformed into a plane wave having a direction parallel to 77, is reflected five times by the mirrors 67 and 77 and is again transformed by the parabolic mirror 57 into a spheric wave having 58 for its centre.

$57_1$, $57_2$, $57_3$, $57_4$ being the positions of the equivalent parabolic mirror for the wavelengths $\lambda_1$, $\lambda_2$, $\lambda_3$, $\lambda_4$, and in the same manner $67_1$, $67_2$, $67_3$, $67_4$, $77_1$, $77_2$, $77_3$, $77_4$ being respectively the positions of the equivalent plane mirrors for the same wavelengths, the rays $59_1$, $59_2$, $59_3$, $59_4$ converge respectively at points $58_1$, $58_2$, $58_3$, $58_4$ situated at the outputs of the guides 46, 47, 48, 49.

Figure 14:
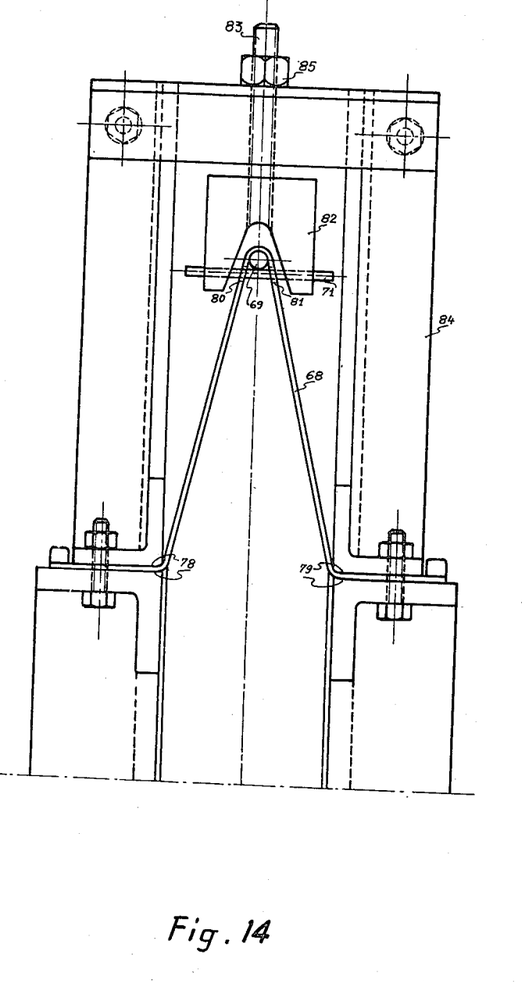
Fig. 14 shows an apparatus for the construction of dihedral mirrors according to the invention.

Fig. 14 shows a device for constructing dihedral mirrors. A sheet of metal 68 of small thickness is folded up around a rod 69 having the profile of the edge of the dihedral and has its ends strongly tightened in vise-pieces 78 and 79 having the profile of the sides of the mirror. The sheet 68 is pierced at regular intervals by holes 80 and 81 on both sides of the edge in which are strung rods such as 71. These rods 71 are connected with straps 82 at the extremity of threaded bolts 83 which pass through a frame 84. These bolts are arranged at the required length by means of screw-nuts 85. The metallic sheet undergoes consequently a certain traction which distorts itself and gives to it the appearance of the required surface, that is to say an hyperbolic paraboloid to obtain equivalent plane mirrors, a ruled surface leaning against parabolae in order to obtain equivalent parabolic mirrors.

Although the invention has been described in connection with specific examples of realization, scope results sufficiently from all that precedes to extend it to other cases of focalisation but these described, for instance to the case of dispersive focalisation of a spheric wave into another spheric wave, the edge and the sides of the mirror being then portions of ellipse.

What I claim is:

1. A reflecting arrangement for dispersively reflecting an input electromagnetic wave energy having a large bandwidth divided in a plurality of communication channels and a common direction of incidence into a plurality of output waves having a small bandwidth corresponding to each channel and different directions of emergence comprising means for spraying the input wave energy onto the reflecting arrangement, a mirror comprising a continuous surface and conical slim horns bored in said surface, the dimensions of the bases of which are comprised between the wavelength and the half wavelength of the wave having the largest wavelength comprised in the energy to be reflected, and having a constant depth along a first curvilineal line of rectangular coordinates drawn on said surface and a depth linearly variable along a second curvilineal line rectangular with the first one, and a plurality of collecting means aligned in a plane passing by the second curvilineal line of coordinates and respectively collecting the partial electromagnetic energies corresponding to the channels.

2. A reflecting arrangement for dispersively reflecting an input electromagnetic plane wave energy having a large bandwidth divided in a plurality of communication channels and a common direction of incidence into a plurality of spherical output waves having a small bandwith corresponding to each channel and different directions of emergence comprising means for spraying the input wave energy onto the reflecting arrangement, a parabolic mirror comprising a continuous surface having the shape of a paraboloid of revolution and conical slim horns bored in said surface, the dimensions of the bases of which are comprised between the wavelength and the half wavelength of the wave having the largest wavelength comprised in the energy to be reflected, and having a constant depth along a first parabolic line drawn on said surface and a depth linearly variable along a second parabolic line drawn on said surface and rectangular with the first parabolic line, and a plurality of collecting means aligned in a plane parallel to the second parabolic line and respectively collecting the partial electromagnetic energies corresponding to the channels.

3. A reflecting arrangement for dispersively reflecting an input electromagnetic wave energy having a large bandwidth divided in a plurality of communication channels and a common direction of incidence into a plurality of output waves having a small bandwidth corresponding to each channel and different directions of emergence, comprising parallel metallic walls having a distance comprised between the wavelength and the half wavelength of the wave having the largest wavelength comprised in the energy to be reflected and adapted for guiding the input wave energy and for spraying the same onto the reflecting arrangement, a mirror having the shape of a dihedral symmetrical with respect to a plane passing by its edge and comprising two ruled metallic walls and two lateral sides joining with the forenamed parallel metallic walls, the distance between the edge and the lateral sides of the dihedral taken in the symmetry plane being linearly variable along the edge, and a plurality of collecting means aligned in the symmetry plane and respectively collecting the partial electromagnetic energies corresponding to the channels.

4. A reflecting arrangement for dispersively reflecting an input electromagnetic plane wave energy having a large bandwidth divided in a plurality of communication channels and a common direction of incidence into a plurality of spherical output waves having a small bandwidth corresponding to each channel and different directions of emergence, comprising parallel metallic walls having a distance comprised between the wavelength and the half wavelength of the wave having the largest wavelength comprised in the energy to be reflected and adapted for guiding the input plane wave energy and for spraying the same onto the reflecting arrangement, a mirror having the shape of a dihedral symmetrical with respect to a plane passing by its edge and comprising a parabolic edge, two ruled metallic walls and two parabolic lateral sides joining with the forenamed parallel metallic walls, the distance between the parabolic edge and the parabolic sides of the dihedral taken in the symmetry plane being linearly variable along the edge, and a plurality of collecting means aligned in the symmetry plane and respectively collecting the partial electromagnetic energies corresponding to the channels.

5. A reflecting arrangement for dispersively reflecting an input electromagnetic plane wave energy having a large bandwidth divided in a plurality of communication channels and a common direction of incidence into a plurality of plane output waves having a small bandwidth corresponding to each channel and different directions of emergence, comprising parallel metallic walls having a distance comprised between the wavelength and the half wavelength of the wave having the largest wavelength comprised in the energy to be reflected and adapted for guiding the input plane wave energy and for spraying the same onto the reflecting arrangement, a mirror having the shape of a dihedral symmetrical with respect to a plane passing by its edge and comprising a rectilineal edge, two metallic walls constituted by portions of hyperbolic paraboloids and two rectilineal lateral sides joining with the forenamed parallel metallic walls, the distance between the rectilineal edge and the rectilineal sides of the dihedral taken in the symmetry plane being linearly variable along the edge, and a plurality of collecting means aligned in the symmetry plane and respectively collecting the partial electromagnetic energies corresponding to the channels.

PIERRE G. MARIE.

No references cited.